A. C. LUDLUM.
BUSHING FOR BUNGS.
APPLICATION FILED MAR. 25, 1914. RENEWED MAR. 31, 1917.
1,226,090. Patented May 15, 1917.
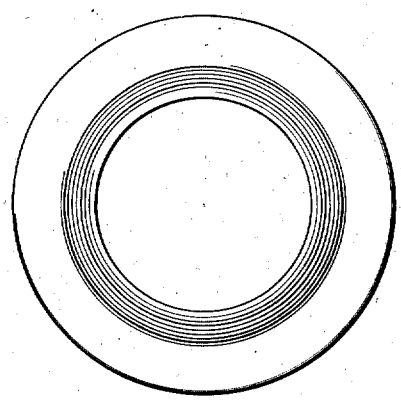
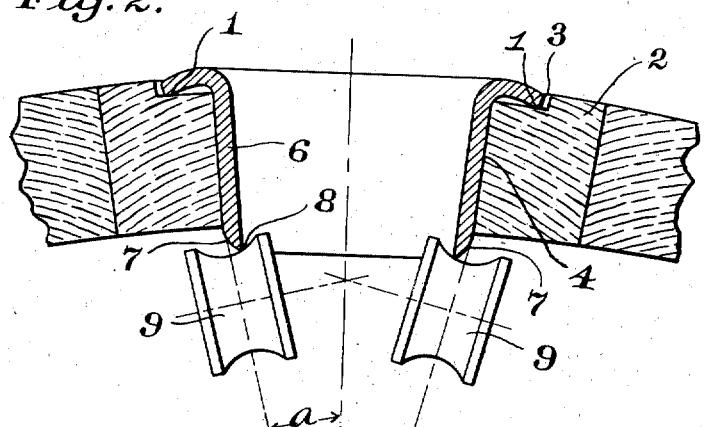
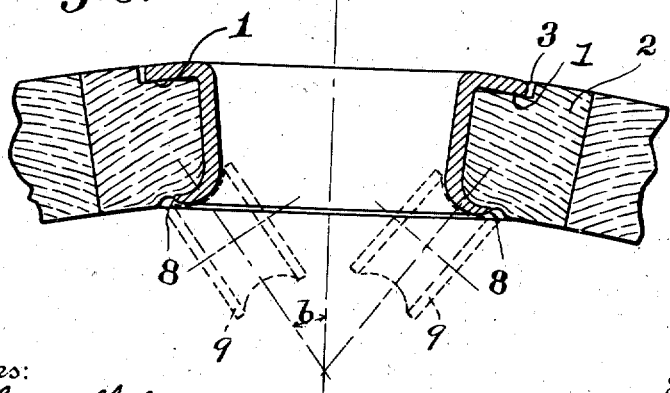

UNITED STATES PATENT OFFICE.

ALBERT C. LUDLUM, OF NEW YORK, N. Y., ASSIGNOR TO NATIONAL BUSH COMPANY, A CORPORATION OF NEW YORK.

BUSHING FOR BUNGS.

1,226,090.     Specification of Letters Patent.     Patented May 15, 1917.

Application filed March 25, 1914, Serial No. 827,019. Renewed March 31, 1917. Serial No. 159,026.

*To all whom it may concern:*

Be it known that I, ALBERT C. LUDLUM, a citizen of the United States, residing at New York, in the county of New York and State of New York, have invented certain new and useful Improvements in Bushings for Bungs, of which the following is a full, clear, and exact specification.

This invention relates to bushings used for receiving the bungs in barrels, and has particular reference to bushings which are expanded and permanently set in the hole by a specially formed tool, without employing screw-threads or spurs for preventing rotation.

The bushing of the present invention preferably has a yielding arch shaped biting flange, and is externally tapered to fit the tapering hole which is bored in the barrel stave. It is the particular object of this invention to provide a bushing which can be driven to closely fit the tapering hole, with or without packing, and which will not require that the hole be bored unnecessarily large in order to premit the inner end of the bushing to pass. Bushings of this general type have heretofore tapered externally to about midway or three-quarters of their length, and have then been flared outwardly by rolling, making the external diameter at the inner end larger than the intermediate external diameter. That is, bushings in common use are doubly flared. With this type of bushing, it is necessary to bore the hole in the stave sufficiently large to receive the largest diameter of the bushing, and as these holes are taper bored it will be seen that an unnecessarily large hole is required, and such a bushing will often leak when set. It has been considered necessary to use the double flared bushing in order that the inner end of the bushing will expand when pressure is applied by the expanding tool. If the bushing is not outwardly flared and thinned at its inner end it is likely to split when set, or to set unevenly. Also, in setting such doubly flared bushings a roller carrying tool has been used in which the rollers are a fixed distance apart, and even then numerous defective bushings are formed unless the relatively fixed rollers are properly spaced, and unless the bushing is evenly driven in the hole. The hole being larger than the bushing in order to receive the lower flare, tends to permit the bushings to be driven diagonally, and there is no way of ascertaining this from the outside.

In making a bushing according to this invention, the bushing is tapered externally, and closely fitting the tapered hole in the stave throughout its depth. The inner end of the bushing is further and more sharply tapered externally so as to form a thin edge in line with the inner surface of the bushing, which edge is first engaged by the setting rollers. The setting rollers are pivoted to swing toward and from each other, and hence their separation varies from a minimum angle when they first engage the bushing, to a maximum angle when the bushing is expanded and firmly set. Thus, the first effect of the rollers at the minimum angle is to engage the thin edge and roll it over on the sharply tapered surface, and as the rolling over progresses the external surface is rolled more on itself, so that the bushing is gradually expanded and firmly set without either splitting or upsetting longitudinally. Splitting, or longitudinal upsetting, frequently happens where the inner end of the double flared bushing is rolled thin as compared with the flange end and set with rollers.

In the accompanying drawing,

Figure 1 is a view of the set bushing;

Fig. 2 is a cross-section showing the novel form of bushing in position ready to be set, and Fig. 3 is a cross-section showing the set bushing.

The bushing is composed of an external curved biting flange 1, set in the stave 2, which is usually countersunk as at 3. The stave is usually bored with a tapered hole 4. The body of the bushing 6 is of substantially uniform thickness, and is internally and externally tapered, as shown in Fig. 2, without being outwardly flared at the lower end. The lower external portion is more sharply tapered as at 7, so as to provide the relatively thin lower edge 8 which first engages with the setting rollers 9. These setting rollers are rounded as shown, and are each pivoted to a shank (not shown) at a point below the rollers, so that the rollers can swing independently of each other toward and from the vertical position. Fig. 2 shows the initial position of the rollers at an angle a, and Fig. 3 shows the final position when the angle between the rollers has increased to angle b.

The initial effect of applying vertical upward pressure to the rollers while pressing down on the yielding biting flange 1 is to turn the thin edge 8 outward, which is rolled back on itself and simultaneously expanded as the pressure is increased and the rollers revolved relatively to the bushing. The yielding flange is somewhat flattened down, as seen in Fig. 3, when the bushing is set and has a resilient effect in tightly holding the wood and preventing leakage. The flange 1 also bites into the stave and prevents turning, which is also assisted by the taper fit of the bushing in the hole. By reason of the initial expansion permitted by the thin edge 8 of the external taper 7, together with the constantly increasing angle between the rollers, the bushing will be gradualy expanded and turned over the inner edge of the stave without upsetting or doubling over vertically, as would be the case if the lower end of the bushing were blunt or rolled extremely thin, or if the rollers did not vary in angle as the expanding proceeds. This is assisted by the tight fit of the bushing at the inner end of the hole, where it is supported by the edge of the wood. By means of the bushing herein described, bung holes can very readily be bushed, and the bushings neither upset nor split, on account of the provision of the external taper 7.

The bushing of this invention can be very cheaply drawn from steel disks, and the biting edge 1 and the taper 7 are provided for in the dies without necessitating additional operations as has heretofore been necessary to complete the doubly flared bushings. The use of a packing is optional and does not require structural change in the bushing itself.

What I claim is:—

1. A bushing for a bung hole having a resilient arched external flange, an externally smooth body, and an expansible inner end, whereby the bushing when set resiliently grips the material of the barrel throughout its thickness to prevent rotation and leakage.

2. A bushing for a bung hole having a resilient arched external flange, an externally smooth body, and an expansible inner end having its outer surface relatively sharply tapered, whereby the bushing when set resiliently grips the material of the barrel throughout its thickness to prevent rotation and leakage.

In testimony whereof I affix my signature, in presence of two witnesses.

ALBERT C. LUDLUM.

Witnesses:
 FRED HAMISCH,
 J. D. CONNOLLY, Jr.